H. SCHLISSKE.
REINFORCED CARDBOARD AND ROOFING PLATE.
APPLICATION FILED MAY 20, 1910.
990,299.
Patented Apr. 25, 1911.
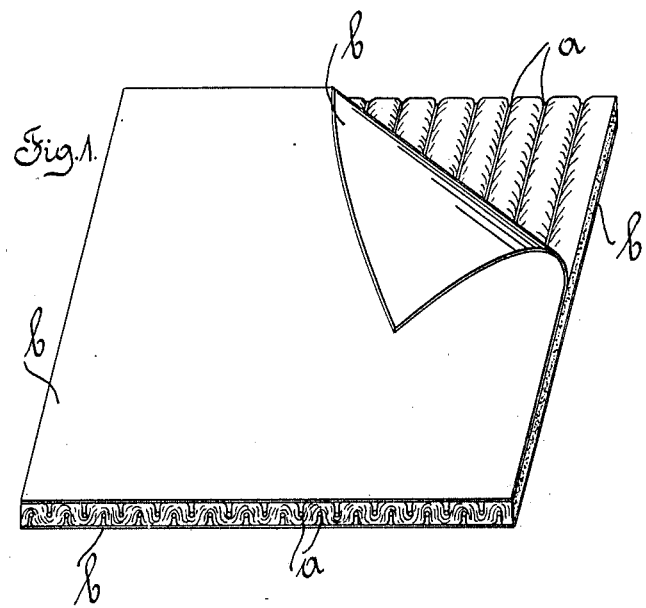
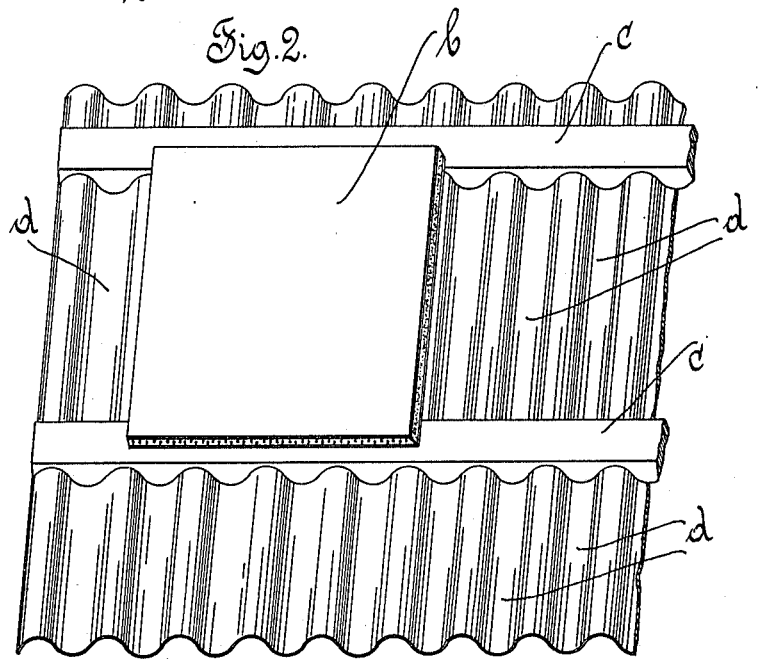
Witnesses:
S. Ford
A. Morrill
Inventor: Hermann Schlisske,
by R. Hadden
Attorney

UNITED STATES PATENT OFFICE.

HERMANN SCHLISSKE, OF MUNSTERLAGE NO. 85, PROVINCE OF HANOVER, GERMANY.

REINFORCED CARDBOARD AND ROOFING-PLATE.

990,299. Specification of Letters Patent. Patented Apr. 25, 1911.

Application filed May 20, 1910. Serial No. 562,383.

*To all whom it may concern:*

Be it known that I, HERMANN SCHLISSKE, a subject of the German Emperor, residing at Munsterlage No. 85, in the Province of Hanover, in the German Empire, have invented a certain new and useful Improvement in Reinforced Cardboard and Roofing-Plates, of which the following is a specification.

The object of this invention is to render card-board of all kinds (including the so-called linen boards, art boards, and leather boards) more efficient for the various purposes to which that material is or can be applied, for example, for packing, roofing wall and floor covering and various constructional purposes.

The invention substantially consists in embedding durable, reinforcing matter between layers of card-board to which said reinforcing matter is firmly united so as to make a strong and durable board.

In the annexed drawings, Figure 1 is a perspective elevation of a reinforced board, with part of the top layer folded back. Fig. 2 shows the board applied to a roof.

The reinforced structure comprises, in general, outer layers of cardboard $b$—$b$, intermediate layers of oiled jute webbing $e$, and a metallic reinforcement embedded in the oiled jute webbing, the whole being united together by means of pressure with or without the use of an adhesive material such as tar. The metallic reinforcement is preferably in the form of a plurality of rods $a$ disposed in parallel relation, between and around which the oiled jute webbing is wound in alternation whereby the rods are embedded in and between the folds of the jute webbing, as clearly shown in the drawings. A plurality of reinforcing layers, with or without intermediate layers of card-board, may be used.

Fig. 2 shows the reinforced board used as a roofing plate, which rests upon supporting rails $c$ on a corrugated roof $d$. The rails $c$ may consist of impregnated felt or other matter. The entire roof, or such part of it as is to be protected, is covered with reinforced board applied as shown. The space under the board, between the rails $c$ contains an insulating layer of air.

What I claim as my invention and desire to secure by Letters Patent of the United States is:—

1. A reinforced structure comprising outer layers of cardboard, oiled jute webbing between the said cardboard layers, and a metallic reinforcement embedded in the oiled jute webbing.

2. A reinforced structure comprising outer layers of cardboard, oiled jute webbing disposed between the said layers of cardboard, and metal reinforcing rods, the said oiled jute webbing being folded alternately backward and forward between and around the said reinforcing rods whereby the said rods are embedded between folds of the said jute webbing.

In witness whereof I have signed this specification in the presence of two witnesses.

HERM. SCHLISSKE.

Witnesses:
J. M. BOWCOCK.
R. PAUL THOMPSON.